Dec. 11, 1945.   W. M. SCOTT, JR   2,390,966
AIR BLAST CIRCUIT BREAKER AND CONTROL THEREFOR
Filed Dec. 21, 1940   7 Sheets-Sheet 3

INVENTOR.
William M. Scott Jr.
BY
Samuel Ostrolenk
ATTORNEY.

Dec. 11, 1945.   W. M. SCOTT, JR   2,390,966
AIR BLAST CIRCUIT BREAKER AND CONTROL THEREFOR
Filed Dec. 21, 1940   7 Sheets-Sheet 4

FIG. 8.

INVENTOR.
William M. Scott Jr.
BY
ATTORNEY.

Dec. 11, 1945. W. M. SCOTT, JR 2,390,966
AIR BLAST CIRCUIT BREAKER AND CONTROL THEREFOR
Filed Dec. 21, 1940 7 Sheets-Sheet 5

INVENTOR.
William M. Scott Jr.
BY
ATTORNEY.

FIG.12.

Dec. 11, 1945.   W. M. SCOTT, JR   2,390,966
AIR BLAST CIRCUIT BREAKER AND CONTROL THEREFOR
Filed Dec. 21, 1940   7 Sheets-Sheet 7

INVENTOR.
William M. Scott Jr.
BY
Samuel Ostrolenk
ATTORNEY.

Patented Dec. 11, 1945

2,390,966

UNITED STATES PATENT OFFICE 2,390,966

AIR BLAST CIRCUIT BREAKER AND CONTROL THEREFOR

William M. Scott, Jr., Bryn Mawr, Pa., assignor to I. T. E. Circuit Breaker Company, Philadelphia, Pa., a corporation of Pennsylvania Application December 21, 1940, Serial No. 371,092

11 Claims. (Cl. 200—148)

My invention relates in general to the field of circuit interrupters and more specifically concerns a circuit breaker and a control circuit therefor, particularly adaptable to the protection of mercury arc rectifiers and their associated circuits.

The high speed circuit breaker which I have devised comprises a pair of cooperable contacts upon which a directed high velocity air blast may operate to cause contact disengagement and arc extinction with a minimum of time delay.

A diaphragm valve in each of the anode circuit breakers is the air blast control element and all of these valves are interlocked by means of a manifold in a manner such that automatic tripping of a single pole or manual tripping of all poles may be obtained. The interlocked diaphragm valves serve, in addition, to protect the main air storage tank so that the entire charge of air contained therein will not be lost during a circuit breaker interruption.

Reclosing of the breakers is automatically obtained if the circuit breaker opening has been a result of a temporary mercury arc rectifier fault such as a back fire, but closure of all of the rectifier poles is obtained by having another interlocked control system which in this instance is an air manifold joining the reclosing means of all of the anode breakers.

It is therefore an object of my invention to provide a high speed single pole circuit breaker, particularly adapted for operation in the anode lead of a mercury arc rectifier.

Another object of my invention is to provide means for effectively interlocking a plurality of single pole circuit breakers.

Still another object of my invention is to provide a plurality of circuit interrupters which are effectively interlocked; which interlocking permits independent operation of a single pole when required by the circuit.

A still further object of my invention is to provide a circuit interrupter which operates to interrupt single anode faults without necessarily disconnecting the entire rectifier from the circuit.

Still a further object of my invention is to provide a circuit interrupter which will interrupt momentary faults due to backfires in mercury arc rectifier operation and which will isolate the mercury arc rectifier if a permanent fault has occurred therein.

It is still a further object of my invention to interlock the plurality of single pole anode circuit breakers by means of a compressed air opening and reclosing system and a plurality of electrical switching devices for operating the same.

These and other objects will become apparent from the following specification taken in connection with the accompanying drawings, in which.

Figures 1, 2:
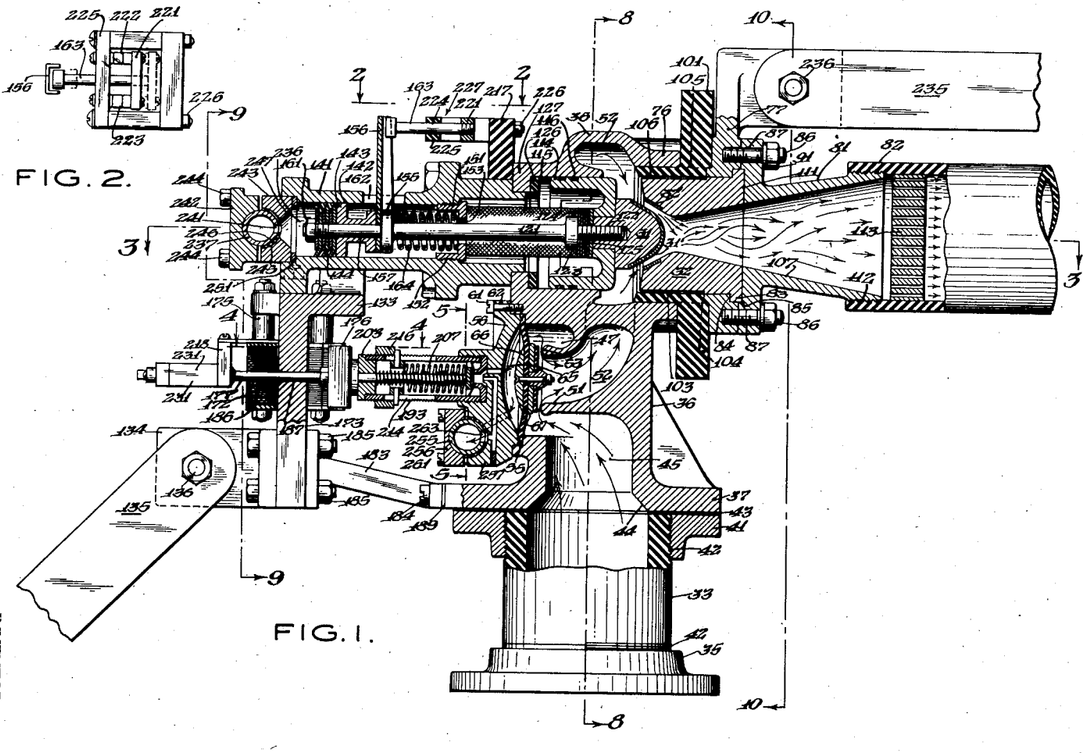
Figure 1 is a broken cross-sectional view of a single pole circuit breaker and the means for interlocking the same with a plurality of similar poles.
Figure 2 is a fragmentary view of one of the control switches operable by the circuit breaker taken along the line 2—2 of Figure 1.
Figures 13, 14, 15:
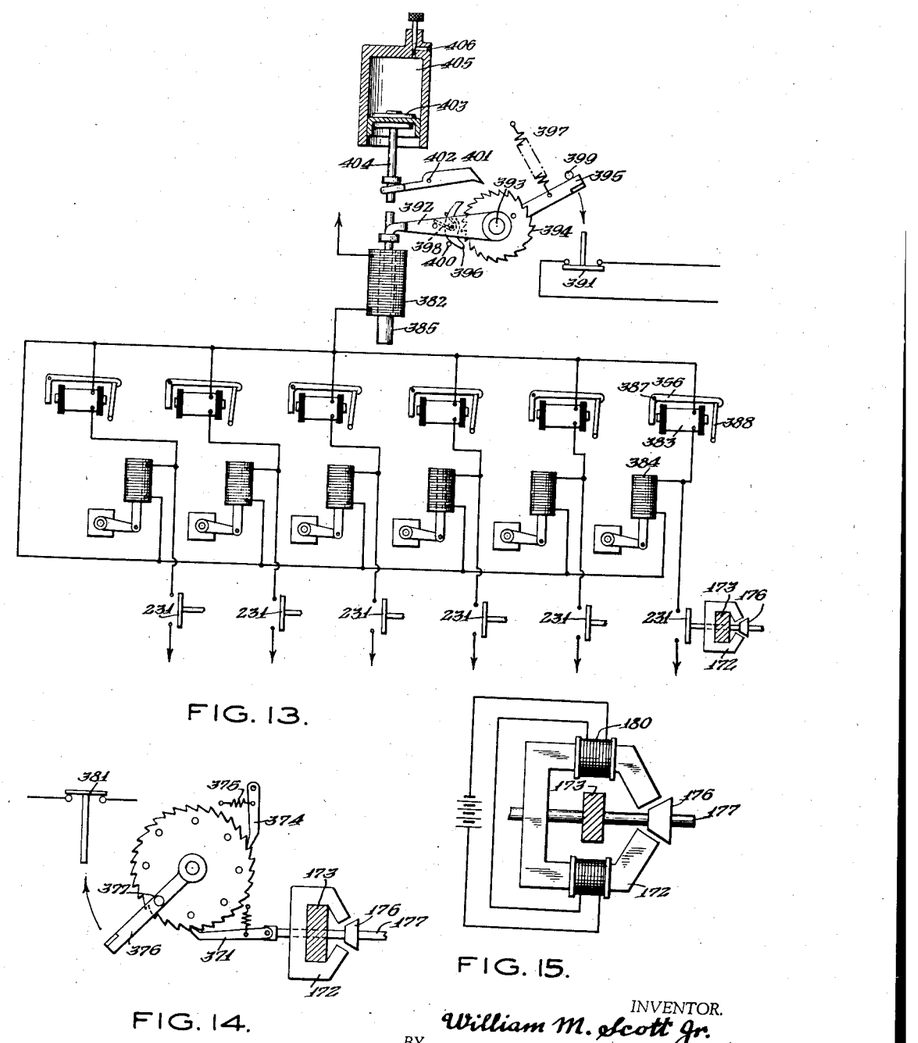
Figure 13 is a schematic representation of one modification of the controlling system of Figure 12.
Figure 14 is a fragmentary schematic view of a counting system operable for circuit breaker control.
Figure 15 is a fragmentary schematic view of the over current magnet and illustrates one form of polarizing coil for reverse current tripping.

In Figure 1 there is shown a single pole circuit breaker which is one element of a plurality of interconnected poles operable within the anode leads of a mercury arc rectifier. Figure 15 schematically indicates a typical installation which in this instance includes a six-phase mercury arc rectifier employing in each of the anode leads, a circuit breaker element of the type indicated in Figure 1.

The rectifier anodes are fed from a six-phase star connected secondary 21 of a transformer, the delta connected primary 22 of which is fed from a three-phase alternating current transmission line. The center tap 23 of the six-phase secondary is connected to the negative terminal of the direct current transmission line and the mercury pool cathode 24 is the positive terminal thereof.

The six anodes 25 within the mercury arc rectifier are each joined to a corresponding anode lead from the six-phase secondary and a single pole circuit breaker is inserted in each of these leads, as will hereinafter be indicated. The plurality of circuit breaker elements employed are interconnected to effect the desired circuit interruptions for mercury arc rectifier operation.

Figure 1A:
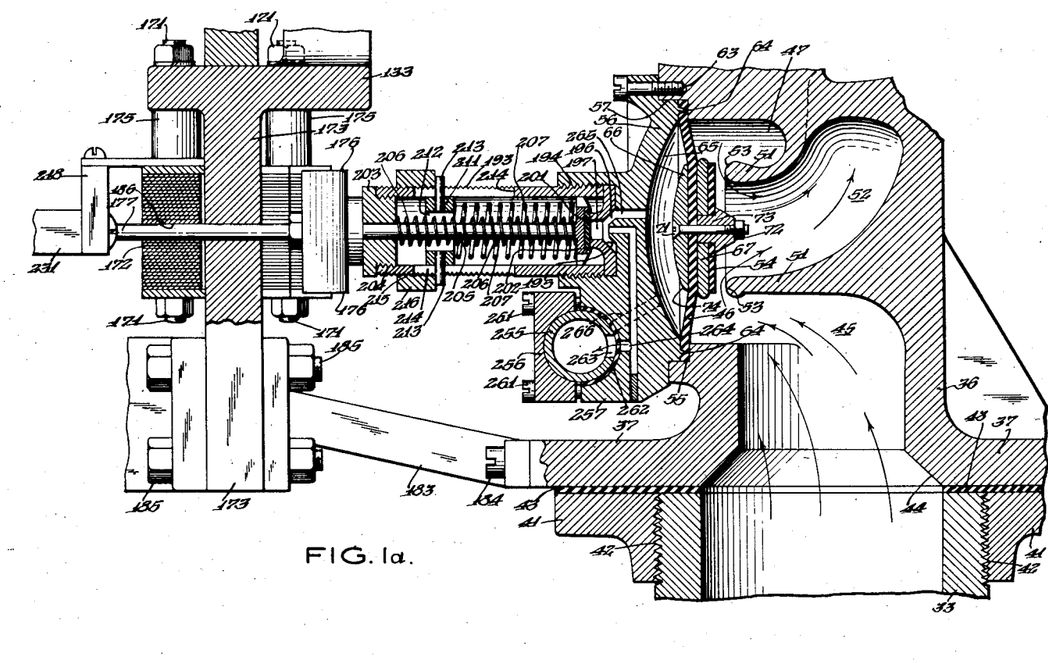
Figure 1a is an enlarged view of part of the circuit breaker shown in Figure 1.

The exact nature of the single pole circuit breaker and of the tripping and control means therefor will now be described and reference is now made to the cross sectional views of the single pole breaker, Figures 1 and 1a.

The single pole of the circuit breaker illustrated consists essentially of two cooperable contacts 31 and 32, and means for directing and controlling an air blast which enters through the pipe 33 and passes over the separated contacts during circuit interruption. The plurality of circuit breakers which are required for the various rectifier anode leads may all be mounted directly upon a common storage tank to shorten and thus facilitate piping connections thereto as indicated schematically in Figure 12. That is, the base 34 of the flange 35 may be coupled by bolts or other suitable means directly to an air storage tank which is charged by means of a compressor. The systems may be adjusted so that pressure therein remains within predetermined limits and that any variations of pressure outside of these limits may operate to open the circuit breakers.

The main metallic casting 36 of the circuit breaker is, as will hereinafter be shown, at a relatively high potential and it is therefore necessary to electrically isolate the casting from ground potential. Therefore, the casting 36 is supported upon the air storage tank by means of a pipe 33 made of a suitable insulating material and of sufficient length to ensure a minimum of leakage and to preclude the possibility of an arc between the circuit breaker frame and the air storage tank.

The base of the casting 36 is preferably a circular external flange 37 which is supported upon the pipe 33 and thus upon the air storage tank by means of the piping flange 41 which is in screw thread engagement at 42 with the insulating pipe 33. The external flange 37 of the casting 36 may then be fastened to the piping flange by any convenient means, as for instance, a plurality of machine screws, but first an annular gasket 43 is inserted therebetween to preclude the leakage of air at the junction of the surfaces.

A tapered opening 44 of diameter equal to the inner diameter of the insulating pipe 33 admits to the casting 36 air which is then conducted through the cored passage 45 to the controllable diaphragm valve 46.

The cored passage 45 terminates in an annular air passage 47 which completely surrounds the diaphragm valve 46. Aligned with the valve is a projecting circular pipe 51 which provides a passage 52 for directing the incoming air to the contacts 31 and 32.

The end surface 53 of the inwardly projecting pipe 51 is smoothed to cooperate with a layer 54 of valve seat material which is carried by the valve diaphragm 46.

Figures 3, 4, 5, 6, 7:
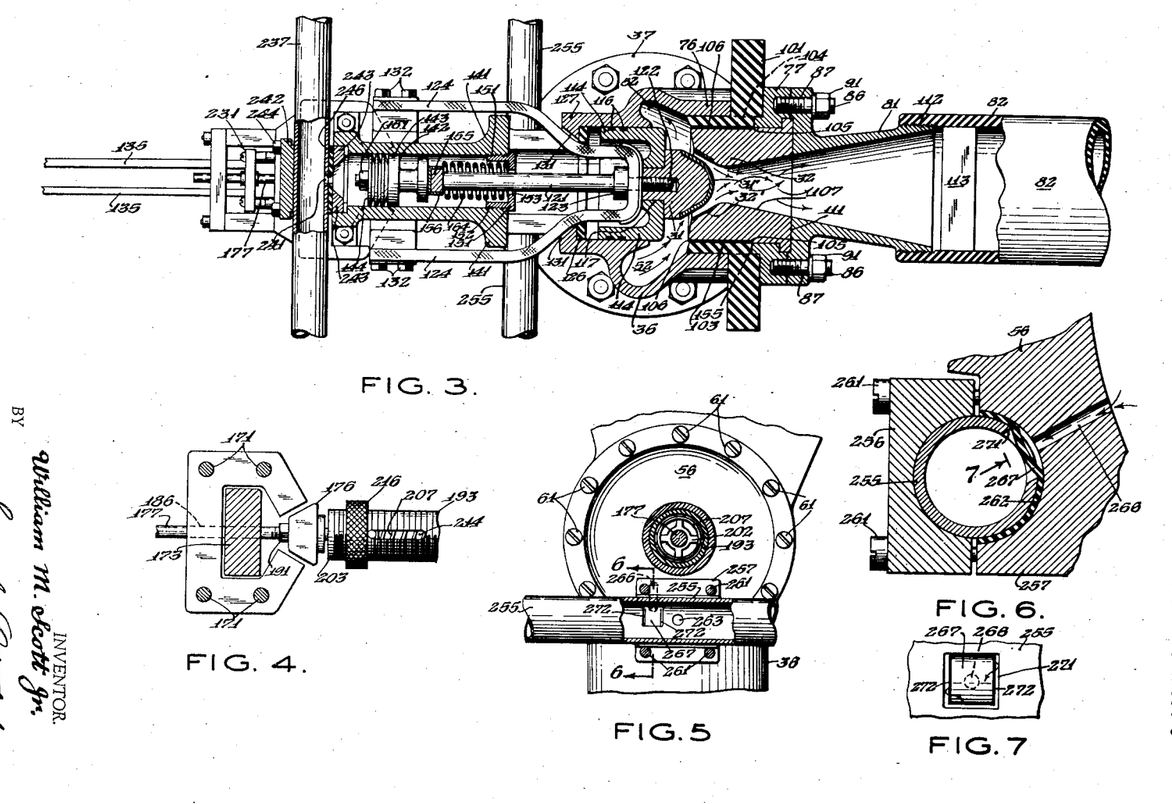
Figure 3 is a cross-sectional view of a single pole circuit breaker taken along the line 3—3 of Figure 1.
Figure 4 is a fragmentary cross-sectional view of the over-load magnet and adjusting means therefor taken along the line 4—4 of Figure 1.
Figure 5 is a broken cross-sectional view of the circuit breaker tripping manifold taken along the line 5—5 of Figure 1.
Figure 6 is an enlarged cross-sectional view of the check valve operable within the air manifold taken along the line 6—6 of Figure 5.
Figure 7 is a supplementary view of the check valve taken along the line 7—7 of Figure 6.
Figure 8:
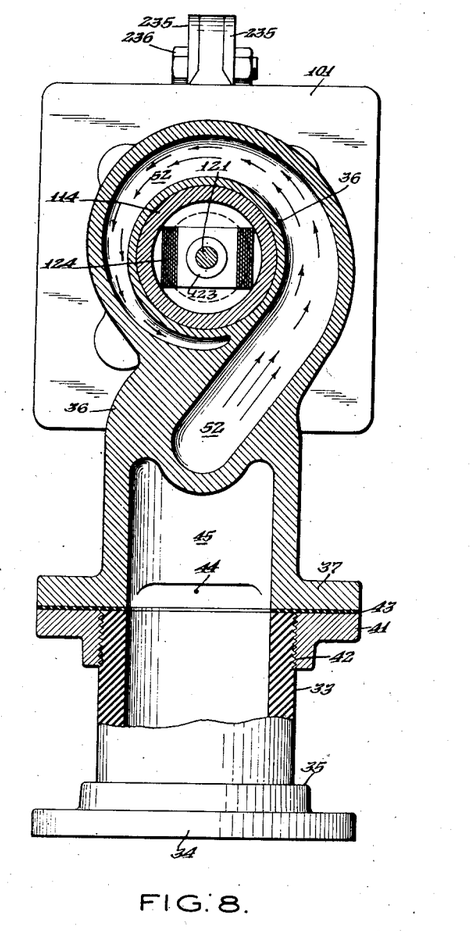
Figure 8 is a cross-sectional view of the single pole circuit breaker indicating the involute air passage surrounding the circuit breaker contacts taken along the line 8—8 of Figure 1.

The passage 52 provided by the annular metallic projection 51 which has been integrally molded into the casting 36 is more clearly illustrated in Figures 3 and 8 wherein it may be seen that the passage 52 is a cored involute, spiralling to completely surround the contact 31 as indicated in Figures 1 and 3.

Thus, air entering into the passage 52 will be conducted to the contact 31 and the air stream will completely surround the contact.

Returning now to the air control means, that is, the diaphragm valve 46 illustrated in Figure 1, it may be seen that air flow in the cored passage 52 is controlled by the position of the valve seat material 54 relative to the edge 53 of the inwardly projecting pipe 51.

The valve diaphragm is supported upon the metallic casting 36 in a counter-bored recess 55 in the wall of the casting. The diaphragm 46 is a circular piece of flexible material such as rubber and is held in the counterbore 55 by means of a circular dome shaped member 56 which is turned down at 57 to correspond with the inner diameter of the counter bore 55.

The dome shaped member 56 is then securely fastened to the main casting 36 by means of a plurality of machine screws 61 which are circularly disposed as is more clearly indicated in the rear view (Figure 5) of the dome shaped member 56.

The machine screws 61 pass through a corresponding set of perforations 62 in the dome shaped member and engage threaded perforations 63 within the main casting 36. The valve diaphragm 46 is thus securely clamped between the projection 57 and the main casting 36. In order to assume an air tight joint at this point and to prevent radial movement of the edge of the diaphragm when subjected to air pressure, a wedge shaped circular protrusion 64 on the projection 57 is forced into the resilient material of the diaphragm when the screws 61 are tightened.

The member 56 has been machined to provide the spherical dome 65 and thus axial displacements of the diaphragm 46 are limited to the space between the dome 65 and the end 53 of the inwardly projecting cored pipe 51. The valve diaphragm 46 is of flexible material and has secured to it two circular metallic disks 66 and 67 on either side of the flexible material. The face of disk 67 is faced with a valve seat material 54 which will provide a suitably close surface engagement with the end 53 of the inwardly projecting passage. The four layers of material therefore which comprise the movable portion of the valve are bound together by the screw 71 and its associated nut 72 which bears against a conical shaped metallic member 73 which assists in directing the flow of air toward the discharge when the valve is open.

The rear face 74 of the metallic disk 66 has been machined to correspond with the dome shaped chamber 65. Thus it may be seen that the inflowing air which enters through the insulating pipe 33 is guided to the annular cored passage 47 surrounding the inwardly projecting pipe 51 and the face of the diaphragm valve. If now the diaphragm 46 is displaced to the left, as viewed in Figure 1, the air will, as indicated by the arrow heads of Figure 1 enter from the passage 45 and passage 47 into the tapered and spiralled passage 52 which supplies air to the contact engaging surfaces. Therefore, actuation of the diaphragm valve 46 will control the circuit breaker blast and will be discussed in greater detail in later paragraphs inasmuch as the structural details of the circuit breaker will now be described.

Contact 31 is a conically shaped butt contact engageable with a nozzle shaped contact 32 along the contact surfaces 31' and 32' which have been faced with a suitable contact material such as a non-welding alloy of tungsten and silver, silver and graphite, or the like.

Nozzle shaped contact 32 is fixed relative to the main frame 36 of the circuit breaker whereas contact 31 is slidable relative thereto. As indicated in Figures 1 and 3, contact 31 has been displaced from its closed position and thus the air flow is indicated by the arrow heads. As the blast air approaches the contacts through a spirally shaped passage 52, as indicated in Figure 8, the air flow about contact 31 will be in the form of a vortex while passing outwardly through nozzle shaped contact 32. Therefore, an arc which is drawn between contact faces 31' and 32' as a result of contact separation will be spun about the contact surfaces. This action will facilitate cooling and decrease the possibilities of contacts 31 and 32 welding. The spinning air exhausting between the contact surfaces and through contact 32 is illustrated schematically by the arrow heads in Figures 1 and 3.

Nozzle shaped contact 32 is supported within a circular opening 75 which is formed within a projecting extension 76 of the main casting 36.

As will be pointed out in later paragraphs, the main frame 36 is at the potential of contact 31 and therefore it is necessary to support contact 32 within the opening 75 by suitable means of insulating material. Contact 32 is secured between the line terminal 77 and the exhaust pipe and muffler 81 and 82. This assembly is made rigid by an external flange 83 on the outer end of contact 32 nesting within counterbores 84 in terminals 77 and 85 in exhaust pipe 81 so that when the parts are assembled as indicated in Figures 1 and 3, the contact 32 will be rigidly held therebetween.

The entire assembly is maintained in fixed relation by means of a plurality of studs 86 extending from terminal 77 and passing through corresponding perforations 87 within the flange end of the exhaust pipe 81. This is more clearly indicated in Figure 10 where the approximately square flanged end of the exhaust pipe 81 is illustrated as carrying in the corners thereof the plurality of nuts 91 which as in Figures 1 and 3 serve to clamp the exhaust pipe to the terminal 77 which is also indicated in Figure 10.

Figures 9, 10, 11:
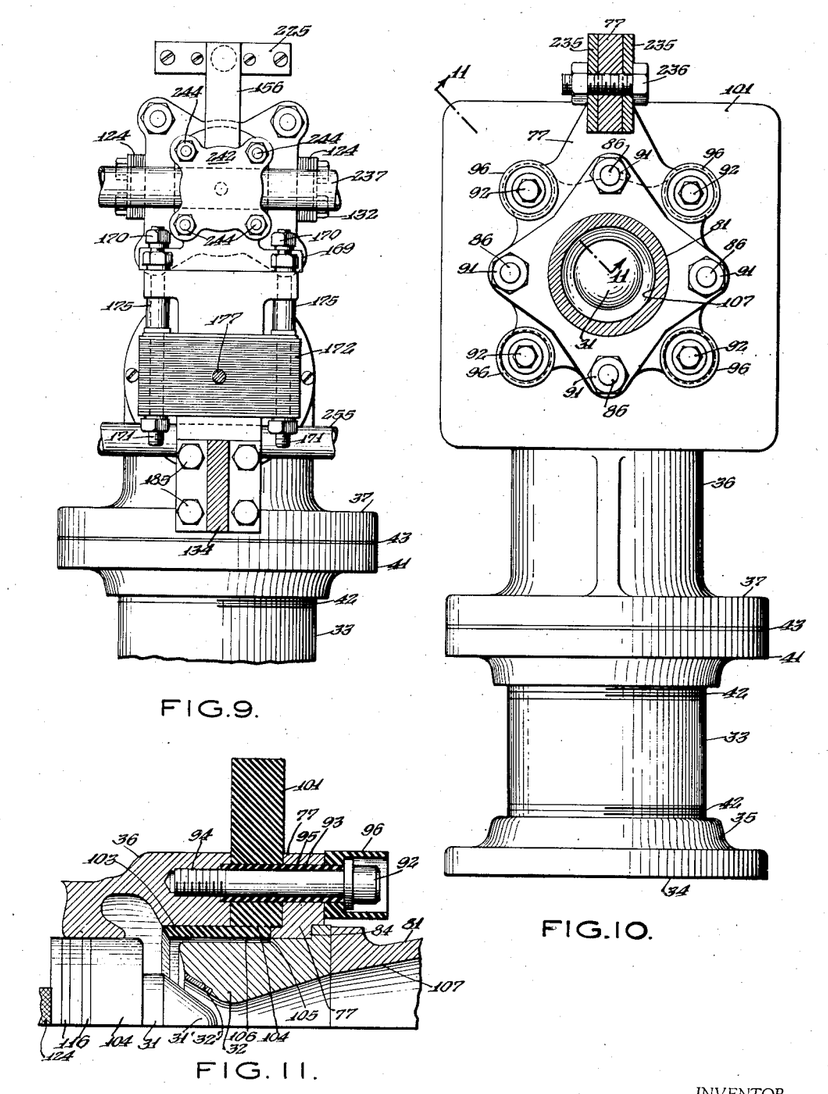
Figure 9 is an end sectional view of the circuit breaker taken along the line 9—9 of Figure 1.
Figure 10 is an end cross-sectional view of the circuit breaker taken along the line 10—10 of Figure 1.
Figure 11 is a fragmentary cross-sectional view taken along line 11—11 of Figure 10.

The assembly of contact 32, terminal 77 and exhaust pipe 81 is then clamped to the main casting 36 by means of a plurality of socket head screws 92 more clearly indicated in Figures 10 and 11. That is, line terminal 77 provides a series of perforations 93 through which the socket head screws 92 may pass into a corresponding tapped perforation 94 in the main casting 36.

It has been previously pointed out that it is essential to insulate line terminal 77 from the main frame 36 inasmuch as frame 36 is at the potential of contact 31 and line terminal 77 is at the potential of contact 32. Therefore, the socket head screws 92 have been sheathed in insulation, that is, a cylindrical tube of insulation 95 has been provided to prevent the shank of the bolt from contacting terminal 77 and the head of the bolt has been similarly protected by a cylindrical cup 96 which has been perforated at 97 to allow the passage of the insulating tube 95.

It should be noted that if desirable, the various tubes of insulating material may be dispensed with if the socket head screws or other types of screws employed to bind the assembly of contact 32, terminal 77 and exhaust pipe 81 to the main frame 36 are made of a sufficiently strong insulating material.

Prior to the insertion of bolts 92 into the main frame, 36, a plate 101 of insulating material is placed therebetween and is perforated at 102 in order to correspond with all of the insulating sheaths 95 which cover the socket head screws employed in the embodiment illustrated.

To serve as additional insulation between the frame 36 and the line terminal 77, a cylindrical tube 103 is cemented to the insulating plate 101 at perforation 104 and is of an outside diameter equal to the inner diameter of the passage 75 in the main frame 36. Therefore, when the contact 32 is secured by means of flange 83 between the line terminal 77 and the exhaust pipe 81 and this entire assembly is subsequently clamped to the main frame as indicated in Figure 1, along with the insulating plate 101 and the insulating cylinder 103, contact 32 will project into the passage 75 and will be centrally located with respect to the spirally oriented air passage 52.

It should be noted that the outer cylindrical surface of the contact 32 has been turned down at 105 to provide an air gap 106 between the insulating tube 103 and the face of the contact 32 which is at the potential of line terminal 77. This, in effect, provides an increased leakage path and therefore reduces the possibility of electrical break-down at this point.

The nozzle shaped passage 107 of the contact 32 provides for the expansion of the blast air in order to reduce back pressure.

Exhaust pipe 81 juxtaposed against contact 32 along the face 111 provides a tapering passage which is a continuation of the tapering passage of the low pressure side of the nozzle. The pipe supports, by means of the screw threads 112, the hollow cylindrical muffler 82 and the deionizing stack 113. This stack comprises a plurality of parallel metal laminations over which the hot arc products pass and are effectively cooled.

Conical contact 31 is mounted upon a piston 114 which is slidable within a cylinder 115 in the main casting 36. In order to prevent leakage of air over the piston 114, a series of grooves 116 have been turned in the piston and piston rings or other packing may be inserted therein.

The contact 31 is centered on the piston 114 by a boss extending into a perforation 117 and is clamped thereto by means of the screw threaded plunger rod 121. This rod has been turned down and threaded at the end 122 which engages a tapped perforation in the contact 31. By tightening these threads, the annular flange 123 is brought into contact with a flexible conductor 124 which has been perforated at 125 to allow the passage of the plunger rod 121. Therefore, bringing plunger rod 121 into screw thread engagement with the perforation in 31 will securely clamp the assembly of contact 31, piston 114 and flexible conductor 124.

The movement of piston 114 is limited by the engagement of contact faces 31' and 32' at one end of the stroke (at which time the circuit is closed) to the engagement of the rear face of the piston with a ring shaped rubber or other flexible washer 126 which has been secured within a reentrant flange 127, molded into the main casting 36. As indicated in Figure 3, the outer edge of this flange has been cut away at 131 to allow for the passage of the flexible conductor 124.

Piston 114 therefore which is operable within the chamber 115 between the limits of engagement with the stationary contact and the annular rubber ring 126, is the operating element of the circuit breaker, that is, operation of the piston 114 in either direction by means of air pressure controlled by diaphragm valve 46 or any of the other valves which will hereinafter be discussed, will operate either to open or close the circuit.

Contact 31 is connected to the external circuit through the flexible conductor 124 which allows movement without in any way impeding movement of the piston. The flexible conductor 124 is composed of a series of highly conductive metal laminations stacked together by suitable means and is fastened at either end to a bifurcated member by means of the plurality of machined screws 132. The bifurcated member 133 then continues downward to engage the line terminal 134 and the cable 135 from the external circuit by means of the bolt or other fastening means 136.

Supported by the flange 127 is a member 141 which positions the plunger rod 121. The member 141 contains a cylinder 142 in which is operable a piston 143 and its associated packing 144 mounted on the end of the plunger.

Secured in one end of the cylinder 142 is a flanged bushing 151 which in this embodiment is fastened by the screw thread 152. A perforation 153 allows the passage of the plunger rod 121 but this perforation is within a reentrant flange 154 for reasons which will be pointed out in a following paragraph.

A flange 155 on the plunger rod 121 which originally had been machined circular similar to the flange 123 is milled off so that it may engage the rectangular cross section of a U-shaped channel 156 as indicated in Figures 1 and 3.

The piston 143 is drilled at 157 to allow the passage of plunger rod 121 which is then clamped thereto by means of the nut 161. Prior to the application of the nut, however, a series of fiber or other type of washers 144 are slipped over the plunger rod 121 and thus when clamped by nut 161 provide the necessary air tight packing for piston 143. The U-shaped channel 156 is held between the flange 155 and the piston 143 and is allowed to extend out through the axial perforation 162 in member 141 so that it may cooperate with the switching member 163 which will hereinafter be described.

Contact 31 is biased normally towards the open position, that is, the position corresponding to contact between the rear of the piston 114 and the shock absorbing member 126. This is accomplished by means of a compression spring 164 which is lodged between the reentrant flange 154 previously described and the flange 155 which supports the U-shaped channel. As the spring is normally under compression, and as the reentrant flange 154 is fixed, there is a tendency to draw contact 31 from engagement with contact 32.

The outer end of the closing cylinder casting is provided, at its lower edge, with a pair of horizontal lugs 169. The "bifurcated" member 133, which is also the over-current bus bar, is supported against the bottom of these lugs by studs threaded into the bar, passing through holes in the lugs and held in position by nuts and lock washers 170. The lower end of the bar is braced by the member 183 as will be described in a following paragraph.

The forked conductor 133 supports, upon a protrusion, the plurality of machine screws 171 which pass through magnet laminations 172. The magnet is composed of stacked soft iron or other magnetic laminations each of which is "horse-shoe" shaped and as such surrounds the magnet bus bar 173 (see Figure 4) which is an integral extension of the forked member 133. As it is desirable to preclude the possibility of current flowing through the magnet, the screws 171 are insulated by means of insulating sheaths 175 which completely surround their respective screws.

Referring now to Figure 4 which is a cross-sectional view of the magnet and magnet bus bar 173, it may be seen that the magnet bus passes directly through the "horse-shoe" shaped magnet formed by the stacked laminations. The armature 176 of this magnet is a trapezoidal laminated bar of magnetic material which is carried upon a plunger 177.

The operation of the magnet may be explained briefly by noting that the line current will flow through the bus bar indicated in Figure 4, and will establish a cylindrical magnetic field surrounding the conductor itself. Therefore, the stacked laminations comprise a magnetic circuit for the flux in the vicinity thereof and accordingly the faces 181 and 182 act as magnet poles and exert a force of attraction upon the wedge shaped armature 176.

It is frequently desirable particularly in the protection of the anodes of mercury arc rectifiers, to cause circuit interruption upon the flow of small reverse currents. This may be accomplished by means of a polarizing coil upon the magnetic structure as is illustrated in the simplest possible form in Figure 15.

Here a coil or plurality of coils 180 surrounding the magnetic structure is continuously energized by a constant voltage. The force exerted upon armature 176 due to the flux of this polarizing coil is in the same sense as the force which will be exerted by the flux produced as a result of reverse current flowing through bus bar 173.

The polarizing flux alone is insufficient to cause displacement of armature 173, but may be adjusted so that relatively small reverse currents will result in actuation thereof to open the circuit breaker. The application of a polarizing coil does not prevent normal operation of magnet upon forward currents.

As indicated in Figure 1, the magnet bus 173 which may, during short circuit periods carry considerable currents, is braced so as to preclude any mechanical deformation thereof due to the stresses developed by virtue of the magnetic forces. The brace comprises the metallic member 183 which has been fastened by means of machine screws 184 to the frame of casing 36 and by means of the plurality of machine screws and bolts 185 to the magnet bus. This brace is insulated from the flange 37 by insulating layer 189; however, the brace itself may be formed from an insulating material.

The electromagnetic device 172 in conjunction with the armature 176 controls the diaphragm valve 46 to control the admission of air to the contact chamber. The plunger rod 177 operates under the influence of the magnet 172 and in order that the rod 177 be maintained in alignment, it passes through a perforation 183 within the magnet lamination stack and through a perforation 187 in the magnet bus bar 173.

The armature 176 is clamped securely to the rod 177 between the flange 179 and nut 191 which engages a series of screw threads on rod 177. The rod 177 is continuously biased towards the right as viewed in Figures 1 and 4, by means included within the cylindrical member 193.

The cylindrical member 193 is fastened to the main frame 36 through the dome shaped member 56 by means of the screw threads 194 upon both the cylindrical member and a corresponding hollow in the rear of the dome shaped member.

However, inserted into the hollow of the dome shaped member prior to the insertion of the hollow cylindrical member 193, is a small circular metal piece 195 which contains a conical valve seat 196 and a cylindrical perforation 197 to permit the passage of air from the diaphragm valve. The conical projection of the circular metal member 195 provides for surface engagement with a layer of valve seat material 201 which is embedded in a metallic disk 202 which is integral with the end of the rod 177.

The disk 202 is machined to correspond with the inner wall of the hollow cylindrical member 193 so that it is maintained central at all times.

The hollow cylindrical member 193 is terminated by a metal stop 203 which is fastened thereto by means of the engaging screw threads 204 and which is perforated centrally at 205 to permit the free operation of rod 177.

It should be noted that bearings are provided for rod 177 by the perforations within the bus bar and in the metal stop 203. The biasing means for rod 177 is obtained by springs acting between the metal disk 202 and stationary members. Thus a small diameter central spring 206 bears against both the inner face of disk 202 and the inner face of the metal stop 203. This spring is of relatively small diameter and fits over the rod 177 which thus acts as a guide therefor.

A second and adjustable spring 207 bears against the inner face of the disk 202 and also against a movable or adjustable guide 211. The guide 211 is a ring shaped metallic member having a perforation 212 of diameter large enough to pass over the spring 206 but small enough to provide a seat for the end of the spring 207. The ring 211 is slidably fitted within the hollow cylindrical member 193 and is adjusted therein by means of a plurality of fins 213 which project through axial slots 214 in the walls of the cylindrical member 193.

These fins may comprise merely two pins which have been embedded in the ring shaped member 211 and project from the axial slots 214. As both spring 206 and spring 207 are continuously under compression, there will be a tendency to move disk 202 and its attached rod 177 to the right as viewed in Figure 1. The magnitude of this tendency is controllable by means of the adjustable nature of spring 207. That is, by threading the outer surface 215 of the hollow cylindrical member 193 and passing a nut 216 thereover and in engagement with the threads 215, the fins 213 may be displaced axially upon rotation of the nut 216. Thus the compression of spring 207 will vary with the position of nut 216.

Obviously, therefore, the variation in the compression forces of spring 207 will accordingly vary the biasing force of rod 177 and its associated magnetic armature 176. As will be indicated in the following, the magnet 176 when operated controls the operation of contacts 31 and 32. Accordingly, an adjustment of either the air gap or restraining force on the armature 176 will correspondingly vary the magnetic forces required to displace the same and thus operate the circuit breaker. This then provides an adjustment for the tripping current required.

Two small control switches are actuated by the rods 163 and 177. The switches as more clearly indicated in Figure 2 are mounted upon insulating brackets such as 217 and 218. The switches operable by their contact carrying rods are essentially butt contact switches employing a metallic bridge to complete the circuit between the two contacts. Thus as indicated in Figure 2, the rod 163 carries the bridging metallic member 221 which is engageable with the two butt contacts 222 and 223.

The rod 163 passes through a perforation 224 within an insulating member 225 and thus is maintained in slidable relation therewith. The entire switch is clamped to the insulating bracket 217 by means of the screws and bolts 226.

When the circuit breaker contacts 31 and 32 are closed, switch 163 is in the open circuit position. On the other hand, when rod 177 is biased so that valve seat material comes into contact with the metallic insert 195, the switch 231 is in the closed circuit position.

When contacts 31 and 32 are closed, current flows from the bus bar or other electrical connection 235 which is bolted to the line terminal 77 bus by means of the bolts 236, through the engaged contacts and then through the flexible conductor 124 to the tines of the bifurcated member 133, then through the magnet bus bar 173 and out through the cable or bus bar 135 fastened thereto.

Under closed circuit conditions and no electrical disturbances, the full tank pressure will exist in the passage 45 and the annular cored chamber 47 on one side of the diaphragm valve 46 and also in the chamber between the valve 46 and the dome shaped member 56. Under these conditions of equalized unit pressure on both sides, the valve 46 will be displaced more to the right as viewed in Figure 1 inasmuch as the left side of the valve has a considerably larger area than the ring-shaped under side of the valve. Therefore, with equal unit pressures on both sides of the diaphragm, the valve seat material 54 will be forced into engagement with the end of the projecting passage 52 and thus cut off the supply of air to the involute passage surrounding the contacts.

The contacts 31 and 32 are maintained in engagement allowing full air pressure to be established within the chamber 236 which will thus actuate piston 144 and rod 121 in a direction which will close the contacts against the action of the biasing compression spring 164.

However, the removal of valve disk 54 from contact with the projecting pipe 53 will allow full pressure to be built up in the involute passage 52 to the contacts 31 and 32.

From Figures 1 and 3, it may be seen that piston 114 which is fixed relative to contact 31 is of considerably larger diameter than the piston 143 and therefore without necessarily releasing the pressure in the chamber 236, the contact 31 will be displaced to the left as viewed in Figure 1.

Full tank pressure is maintained in the chamber 236 by means of the closing manifold 237 which connects the air from the storage tank to each of the single pole circuit breakers controlled therefrom. The manifold 237 itself may comprise a Bakelite tubing perforated at 241 to allow the admission of air to and from chamber 236 and the entire manifold as indicated in Figure 3 is supported between two clamping brackets 242 and 243 which are maintained in fixed relation by means of the plurality of bolts 244 which, in addition, fasten the brackets to the frame of the circuit breaker.

The nature of the manifold mounting is indicated in Figure 9 which is an end view of the circuit breaker. The clamping action is secured by means of the bolts 244 as previously mentioned which pass through suitable lugs cast into the clamping bracket 242.

The semi-cylindrical depression 245 in the clamp 243 which surrounds the air passage 241 which has been cut into the manifold 237 must be lined with a suitable gasket 246 to prevent leakage therefrom.

The clamping bracket 243 must, in addition to the semi-cylindrical depression 245, contain a perforation 247 which will allow the entrance of air to the chamber 236. Again, to prevent air leakage, the surface contact between the clamping bracket 243 and the hollow cylindrical member 141 must be sealed with a suitable gasket 251.

The blast valve control manifold 255 is supported by means of a semi-cylindrical clamp 256 upon a boss 257 integrally formed on the dome shaped member 56. The boss 257 has been machined to accommodate the cylindrical manifold 255 which is rigidly clamped thereto by means of the plurality of bolts 261 which pass through suitable perforations in both the clamp and the dome shaped member. The manifold 255 comprises a Bakelite or other suitable insulating tubing which is interconnected with each of the poles of the circuit breaker as will be pointed out in the following discussion.

To prevent leakage of air around the junction of the Bakelite manifold and the semi-cylindrical cut away in the boss 257, the semi-cylindrical opening is lined with a rubber of other flexible gasket 262 as is more clearly illustrated in the enlarged fragmentary view of the tripping manifold Figure 6.

The tripping manifold 255 is connected by air passages to the control diaphragm valve 46 and the valve 201 which is operated by the electromagnetic device 176. A perforation 263 in the tripping manifold is connected by means of the duct 264 to the nozzle 197, formed in the metallic disk 195, which forms the seat for the valve disk 201.

The cylindrical opening 197 and the conical tapering opening 196 have, in addition, been joined to the inner portion of the dome shaped member 56 by means of a circular array of holes 265 and thus duct 264 is effectively interconnected with the space between the dome shaped member 56 and the diaphragm valve 46, whether the valve 201 is open or closed. The portion of duct 264 projecting into the nozzle shaped opening in disk 195 has been designed so that an aspirating effect is secured when air flows through duct 264 and through opening 197, to draw the air through holes 265 when valve 201 is opened.

An additional air passage is provided from the manifold to the dome space by means of a duct 266, more clearly illustrated in Figure 6, and the flow of air through this duct is controlled by a check valve 267 formed in the rubber gasket 262. As seen in Figure 5, this duct is displaced sideways from duct 264. The duct 266 leads into the manifold 255 through a rectangular or other relatively large perforation 271 which has been formed therein. It should be noted from Figure 6 that the perforation 271 is relatively large when compared to the duct 266.

This valve is formed by cutting two parallel slits 272 into the gasket on either side of the duct 266 as indicated in the fragmentary view of Figure 7.

The diameter of the larger perforation 271 in the manifold is greater than that of the spacing between the two slits. Therefore, when the pressure in the manifold 255 is low, as compared with the pressure of the air within the dome, there will be a tendency for the air to flow, as indicated by the arrow heads in Figure 6, in a manner such that the flexible material contained between the slits 272 will bend as indicated and thus allow air to pass around the slits and into the manifold.

On the other hand, if the pressure in the manifold 255 is greater than the pressure within the dome, there will be a tendency to force the flexible material, between the slits, up against the smaller duct 266 and thus effectively check the flow of air through the duct. The reasons for this arrangement will be taken up in the following paragraphs.

When the circuit breaker is connected in circuit with the anodes of the rectifier as in Figure 15, and all the poles are closed, the individual poles are interconnected by the manifolds 237, and 255, the full tank pressure will exist in both manifolds. Therefore, as a full tank pressure also exists in the passage 45 and in the annular chamber 47, the diaphragm 46 will be moved as determined by the side having the greater surface area.

This obviously is the side which is adjacent the dome shaped member 56 as the area of the valve disk covering the blast pipe is at atmospheric pressure. Full tank pressure exists between diaphragm 46 and the inner wall of the member 56 inasmuch as this chamber is connected with the tripping manifold 255 through the duct 264 and the plurality of perforations 265. It should be recalled that for normal conditions of operation (that is, values of current up to the current for which the armature is adjusted) that the valve 201 is normally biased to engagement with the disk 195 and therefore the air within the dome and within the tripping manifold does not escape. Should a fault occur on the anode to which the pole under discussion is connected, the armature 176 would be actuated to the left as viewed in Figure 1 under the influence of magnet 172, and the valve 201 will be removed from surface engagement with the disk 195.

This will immediately allow the air contained within the dome to exhaust through the plurality of openings 265 and through the nozzle shaped opening 197. This air will pass to the outer atmosphere through the guide fins around the valve 201 and then through the perforations 214 within the wall of the hollow cylindrical member 193.

In addition to this escape air which is flowing through opening 197, air will flow from the tripping manifold through the duct 264 and out through the opening 197. Inasmuch as this outflowing air is at a high pressure, means must be provided to prevent it from reducing the velocity flow from the dome through this passage. The aspirating effect has been arranged in order to increase the velocity of the air flowing from the dome. High pressure air cannot enter the dome through the duct 266 because the check valve 267 effectively blocks any such flow.

A reduction in pressure within the dome will immediately allow the full air pressure contained within the chamber 47 to actuate diaphragm valve 46 to the left as indicated in Figure 1 and accordingly allow the main air blast entering from the tank, upon which the breaker is mounted, to flow into the involute passage 52. The increase in pressure within the passage 52 will operate upon the relatively large diameter piston 114 and will thus force contact 31 to the left against the action of the high pressure air upon the small diameter piston 143.

Immediately thereafter an arc will be drawn between contacts 31 and 32 which will be extinguished by means of the high velocity air blast which is in this instance a rotating or spinning air blast.

The heated air will exhaust through the nozzle shaped contact 32 and its associated extension 81. Upon flowing through the muffler 82, the air stream will be cooled by the stack 113 which, as previously described, comprises a parallel stack of spaced metal plates.

During the operation of the circuit breaker under the influence of an overload or fault current two other important operations are performed in the following sequence. First, upon the actuation of magnet armature 176, the switch 231 is opened, and second, immediately following the displacement of contact 31 to the left, the contacts of switch 227 are closed.

The position of the armature 176 is determined by the current flowing through the magnet bus bar 173 and therefore immediately following current interruption. the force upon armature 176 will vanish and therefore the armature 176 will again be solely under the influence of the biasing springs 206 and 207.

The springs will carry the valve disk 201 into engagement with the metallic member 195. It is important to note that the springs 206 and 207 must supply sufficient biasing force to close the valve although full tank pressure exists within the opening 197. The reclosure of valve 201 will, through ducts 264 and the plurality of openings 265, cause the pressure to the rear of diaphragm 46 to build up to the full tank pressure whereupon the diaphragm valve will immediately close and thus cut off the supply of air flowing through the involute passage 52.

This precaution has been taken, to preclude the possibility of the air stored within the tank from completely discharging through the chamber 52 and its associated exhaust passages. Again, assuming that no other external influences have acted upon the circuit breaker, the removal of the air supply from chamber 52 will effectively decrease the pressure therein and accordingly if the full pressure still exists within the closing manifold 237 air will flow to operate the piston 143 and its associated piston rod 141 to the right as viewed in Figure 1 to close contacts 31 and 32 and thus complete the circuit which had been interrupted by means of the automatic electromagnetic tripping device 172.

The cycle of events described immediately above concerning the operation of the circuit breaker under the influence of an overload assumed that the pressures in the two manifolds 237 and 255 remained at the storage tank value.

The nature of the changes occurring in the pneumatically operated control system will now be described with reference to the operation of a series of single pole circuit breakers, each of which is in circuit with an anode of a mercury arc rectifier.

The complete control system for a circuit breaker of which Figure 1 is a typical example, comprises means for manually and automatically completing the circuit to all of the anodes simultaneously. In addition, it contains a plurality of protective features such as under pressure tripping mechanism and may be arranged so that each circuit breaker may through a counting system open and reclose a predetermined number of times prior to the opening of all the poles of the circuit breaker.

Figure 12:
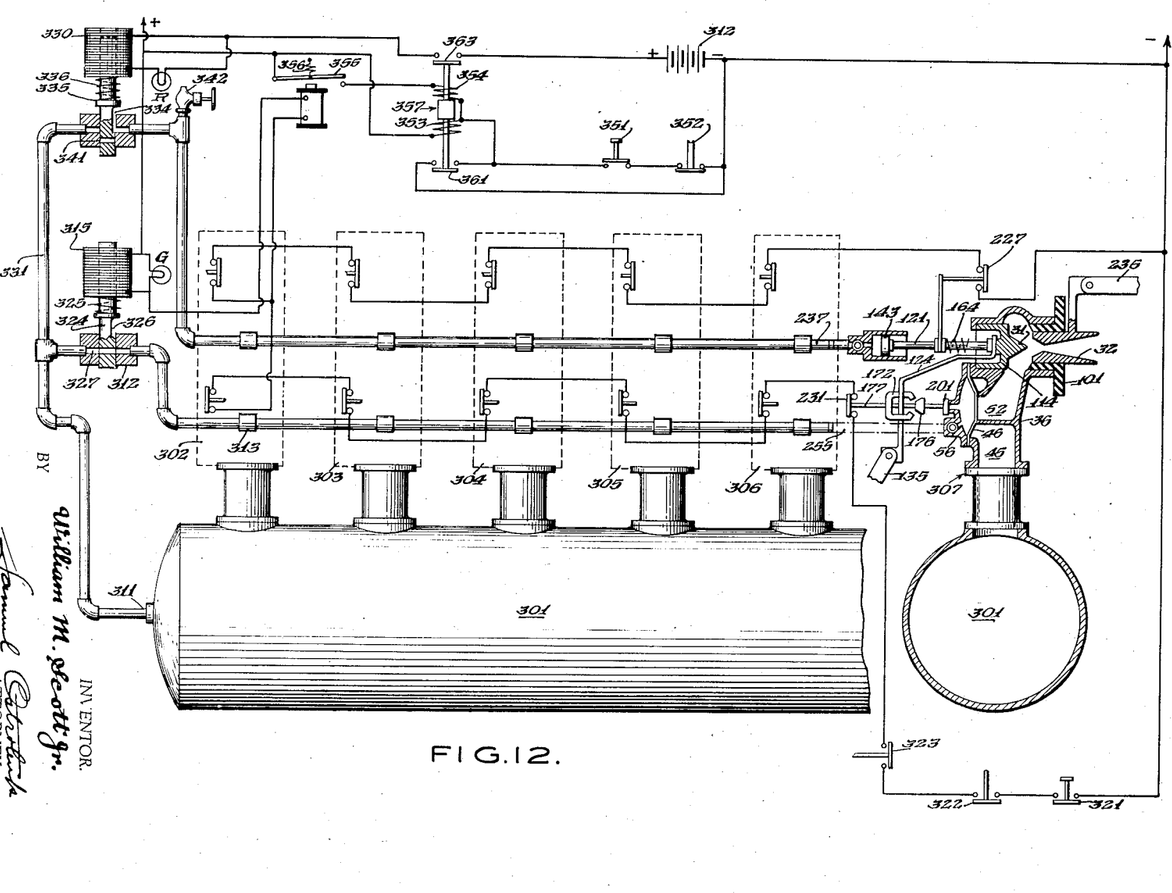
Figure 12 is a schematic representation of the plurality of anode circuit breakers and the control means therefor.

The control system schematically illustrated in Figure 12 shows a plurality of poles such as those of Figure 1 insulatedly mounted upon a main storage tank 301 which is illustrated in elevation and in section. This storage tank is maintained at a pressure within predetermined limits by means of an air compressor.

The six single pole circuit breakers, which have been schematically represented, are indicated by the numerals 302—307 but to facilitate the following description of the operation of the controlling system, the pole 307 has been drawn to be a diagrammatic representation of the pole of Figure 1.

In carrying over the reference numerals applied in Figure 1, the current enters the pole 307 through the bus bar 235 which is joined to the contact 32 mounted upon an insulator 101 within the main casting 36. Cooperating contact 31 is mounted upon a piston 114 which is in turn in operative relation with smaller diameter piston 143 through rod 121. From contact 31 the current is carried by the flexible conductor 124, by bar 173 through the "horse-shoe" magnet 172, and thus to the bus bar 135.

The armature 176 is in operative relation with the magnet 172 and is carried upon the plunger rod 177 which in turn carries the valve 201. The diaphragm valve 46 controls the air stream entering through chamber 45 to passage 52 which surrounds the contacts. The tripping manifold 255 communicates with each of the domes formed between member 56 and the diaphragm 46; and the closing manifold 237 communicates with each of the closing cylinders and associated piston 143.

The switches 227 and 231 are operated by the plunger rods 121 of the breaker contact and 177 of the armature respectively. The circuit breaker 307 is illustrated as tripped and having been caused to remain open. However, it should be noted that the valve 201 has been closed and that therefore diaphragm 46 has been displaced under the influence of air entering the dome from the manifold 255 to shut off the blast air.

Air is supplied to the tripping manifold 255 through a tap 311 from the main storage tank through an electromagnetically operated valve 312. The members 313 at each of the poles represent the junction between the manifold 255 and the diaphragm valve 46 of each of the poles. The control system is electrically operated from a direct current source which may be copper-oxide rectifiers, batteries or the like, and has been schematically illustrated by the battery 312.

The valve 312 is controllable by means of the electromagnetic device which in Figure 12 is schematically illustrated as a plunger type solenoid 315 which in the circuit indicated is operated by two parallel switching and control systems. One of these control lines originates at the negative control bus bar and contains in series therewith the plurality of switches 227 each of which is operated by the piston rod 121 of its associated circuit breaker.

From the plurality of series switches 227 the electrical circuit then passes through relay 316 and solenoid 315 and then terminates at the positive bus bar. A second circuit also originates at the negative control bus bar and then contains three switches in series: switch 321 which is the hand trip, switch 322 which is the underpressure automatic trip, and switch 323 which is an interlocking switch. These three switches and their specific functions will be described in later paragraphs.

In series with these three switches are the plurality of switches 231 one of which is mounted upon each of the circuit breakers. At the termination of these switches, the control line extends to the positive bus through the relay 316 and the solenoid 315.

There are, therefore, two parallel circuits for controlling the relay 316 and the solenoid 315, and either circuit will be effective for the energization thereof.

Each circuit comprises a plurality of switches in series. Therefore, if one or more switches in each of these circuits are opened, the relay and solenoid will be deenergized. When all of the circuit breakers are closed, the corresponding switches 227 are all in their open position and the control of the relay and solenoid depends solely upon the normally closed switches in the other circuit. Upon the opening of all the circuit breaker poles, a circuit is completed through all the switches 227 for purposes to be described later.

Solenoid 315 when in the energized position as indicated in Figure 12 allows passage of air from tank 301 to the tripping manifold 255 and thus permits the entry of air into the space between the dome shaped member 56 and the diaphragm valve 46. However, when in the deenergized position, the schematically represented plunger 324 will be actuated by the spring 325 to allow the high pressure air within the tripping manifold 255 to exhaust through the indentation 326 contained therein. The operation of solenoid 315 will not permit the escape of air through the coupling 327 within the valve and thus will not permit the escape of air stored within the tank.

The closing manifold 237 utilizes the compressed air of the storage tank 301 taken at the tap 311 through pipe 331. An electromagnetically operated valve 332 controls the influx of air thereto and when the solenoid 330 is in the deenergized position as indicated in Figure 12, the air contained within the closing manifold 237 is permitted to escape through the piping connection 333 and the indentation 334 within the solenoid plunger 335.

The spring 336 is employed to depress the solenoid plunger 335 when the electromagnetic device is deenergized. In the energized position, the perforation 341 within the solenoid plunger permits the flow of air from the tank 301 to the closing manifold 237.

Joined to the closing manifold is a relief valve 342 which may be employed to vent the closing manifold. When this valve is open, accidental closing of the circuit breaker contacts is impossible.

It is to be recalled from the construction of the single element of the circuit breaker as indicated in Figure 1, that the switching member 227 is open circuited when the contacts 31 and 32 are in engagement and the switching elements 231 contained on each of these elements are in the closed circuit position, during normal conditions.

Therefore, when the circuit breaker is in the closed circuit position, the switches 227 do not control the operation of the electromagnetic device 315. If normal conditions prevail, the switches 231 and the switches 321, 322 and 323 will all be closed and the electromagnetic device 315 will be energized and the plunger 324 will be in the position indicated in Figure 12. This allows air pressure to be built up within the tripping manifold 255 which closes the diaphragm valve 46 to prevent the flow of air into the involute chamber 52.

This condition, of course, prevails in each of the individual circuit breaker poles 302—307. If any one of the switches 321, 322 or 323 are opened for reasons which will hereinafter be described, the electromagnetic device 315 will be deenergized and vent the tripping manifold 255 to cause the opening of all the diaphragms by virtue of the pressure drop within the dome.

When the tripping manifold is vented by the deenergization of solenoid 315, air flows from the dome through the manifold and to the atmosphere through the passage 264. The check valve in the tripping manifold 254 assists in the release of the dome pressure since it permits the flow of air from the dome through relatively short passage 266 (as illustrated in Figure 6) to the manifold. The check valve, therefore, functions to accelerate circuit interruption accomplished by the opening of switches 321—323.

Energization of any one of the trip magnets will cause valve 201 instantaneously to vent its associated dome and cause the main contacts of the breaker to separate. Since valve 201 is mechanically interconnected with switch 231, displacement thereof to vent the dome will cause deenergization of solenoid 315, venting of trip manifold 255, and subsequent opening of all the other poles of the circuit breaker.

It is desirable to reenergize the electromagnetic device 315 immediately after circuit interruptions so that the valve diaphragm 46 may reclose and preclude the exhaustion of the air within the storage tank 301.

If tripping occurs due to overcurrent on one of the poles (or reverse current, when a polarizing magnet coil is employed), and thus due to a movement of one of the switches 231, reenergization of the electromagnetic device 315 will occur immediately after current interruption, since the compression springs acting upon the armature will close switch 231 of the initiating pole, and complete the energizing circuit of the solenoid.

However, if circuit interruption is a result of operation of one of the three switches 321, 322 and 323, it is necessary to provide other means for reenergizing electromagnetic device 315 in order to reclose the diaphragm valves 46 to preclude the escape of the entire charge of the storage tank. These means will be described subsequent to the description of the switches 321, 322 and 323.

Inasmuch as the circuit into which these three switches are connected controls the tripping of the circuit breakers, these switches are utilized to provide manual and other types of automatically operating systems, as follows:

Switch 321 is a normally closed manually operated push button. It provides for a hand trip whenever it is necessary to shut down the rectifier or other apparatus connected thereto.

Switch 322 is controlled by a pressure guage mounted upon the storage tank. Thus if the pressure within this tank falls to the minimum value required for effective and rapid circuit breaker operation, this contact will interrupt the circuit.

Switch 323 is controlled by a circuit breaker or disconnect switch connected in any other circuit of the rectifier or associated apparatus. Thus, if other switching means is operated or an undesirable condition arises, it may be necessary to shut-down the complete system.

Additional switches may be added to the control line comprising the three above described switches and the switches 231 which are operated upon individual circuit breaker elements, in order that other devices within the system may control the operation of the anode circuit, if necessary.

Since these three switches may operate and remain in their open circuit position, it is necessary as previously mentioned to provide means operative to reclose diaphragm valves 46 so that the compressed air within the tank may not be exhausted.

This is accomplished by the series of interconnected switches 227 actuated by the piston rod 121 of the contact 31. Accordingly, following circuit interruption due to a disturbance within the control line containing the switches 231, and 321, 322 and 323, contact 31 and its associated piston rod 121 will be displaced to the left as viewed in Figure 12 and the arc extinguished. Upon the completion of the displacement of all the pistons, contacts 227 will close and reenergize the electromagnetic device 315 although one of the switches in the parallel control line may be open. This reenergization will result in the closure of diaphragm valves 46.

Manual closing of the circuit breaker is accomplished by the operation of the normally open switch 351. This switch through the agency of relay 357 controls the solenoid 330 of the air valve 332 in the closing manifold. The energization of electromagnetic device 330 will, as previously mentioned, permit the influx of high pressure air through valve 332 to the closing cylinders and their associated pistons which will move the contacts 31 and 32 into engagement.

A second switch 352 with normally closed contacts, is in series with switch 351, and opens when the air pressure in tank 301 is below a safe value for closing the breaker on a fault. As will be seen, the cycle of events required for manual closing will be impossible when the contacts of switch 352 are open.

The relay 357 comprises an armature 358 normally biased to a mid position between two magnet poles (not shown) which are energized by the coils 353 and 354. The contacts 361 and 363 are normally open and moved to closed position by the armature when it moves upward, toward the magnet pole of coil 354.

The coil 354 is magnetically stronger than coil 353 so that when the coils are energized simultaneously by the closure of switch 351, the upper coil predominates and the contacts close. The contact 361 short circuits the switch 351, so that after operation it may be released without deenergizing the relay. The contact 363 completes the circuit to the solenoid 330 of the solenoid of the closing valve.

The circuit of coil 353, when the relay is energized, is from the negative control bus, through the switches 351 and 361, in parallel and through coil 353 to the positive control bus. The circuit of the coil 354 is from the common terminal of coils 353 and 354, through the coil, through contact 355 of auxiliary relay 316 provided that relay 316 is energized, to the positive bus. Relay coil 316 as hereinabove described, is energized whenever the electromagnetic device 315 is energized through either of the parallel circuits previously described.

The relay armature 358 has two different actions at deenergization depending upon the position of switch 351. Thus, if switch 351 is open, the separation of contacts 355 deenergizes coil 354 and permits the contacts 361 and 363 to part, deenergizing coil 353 and allowing the armature to return to its normal mid-position. If the switch 351 is held in the closed position and the contacts 355 separate, the coil 354 is deenergized, but the coil 353 remains in circuit. The relay armature 358 is therefore drawn down beyond its normal mid-position against the magnetic pole of coil 353 and held in that position with contacts 361 and 363 open. If, during this condition, the contacts 355 of relay 316 reclose, the contacts 361 and 363 will remain open despite the reenergization of coil 354. When the switch 351 is released, the coil 353 will be deenergized and the armature will return to its normal mid-position.

The relay 316 provides an interlock between the tripping system and the solenoid 330 controlling the air pressure in the closing manifold. When the breaker is tripped, the closing manifold must be disconnected from the storage tank and vented to the atmosphere to prevent reclosure of the breaker contacts when the blast valve diaphragms close.

The coil of this interlock relay 316 is, therefore, connected in series with the coil 315 of the tripping manifold valve 312 so that they are deenergized simultaneously upon the automatic opening of any breaker pole. This action vents the trip manifold 255 for actuation of all the unoperated blast valve diaphragms, and at the same time, by the separation of contacts 355 deenergizes relay 357.

Thus, the solenoid 330 is deenergized and the pressure in the closing manifold is reduced to that of the atmosphere, assuring that the springs 164 will hold the breaker contacts open.

Upon the opening of all the circuit breaker poles, a control circuit will be established through the switches 227 to reenergize coil 315 and close all the blast valves, which as previously described, will preclude the exhaustion of the storage tank. This action will simultaneously energize relay 316 and close contacts 355. Under this condition, as previously described, the relay 357 cannot reclose its contacts 361 and 363, no matter whether the control switch 351 is open or closed. This effectively prevents repeated opening and closing of the breaker contacts when the switch 351 is closed during a fault condition.

As the control system requires that full air pressure be maintained on the closing manifold when the breaker contacts are in closed position, the coils 353 and 354 of relay 357 and coil 330 of the air valve are designed for continuous duty. This condition is also true of the tripping system as the coils 315 and 316 are deenergized only during opening movement of the breaker contacts.

It is frequently possible and desirable in the operation of certain polyphase circuits, to permit the interruption and immediate reclosure of a single pole of the circuit breaker without necessarily interrupting the other poles thereof. More particularly, it has been found that internal rectifier faults such as backfires may be cleared by merely opening and reclosing the affected anode circuit, while permitting normal operation of the unaffected anodes.

In order to provide for such an arrangement within the control system illustrated in Figure 12, it is necessary to preclude the operation of one of the switches 231 immediately upon the occurrence of an overload. Yet it is necessary to actuate switch 231 to interrupt all of the poles if the anode fault is permanent in that it cannot be removed unless the mercury arc rectifier is shut down and repaired.

Figure 14 illustrates one modification of a device which may be mounted upon the circuit breaker illustrated, which functions to permit a single pole to open and reclose several times before the entire mercury arc rectifier is taken out of operation.

In order to modify the circuit breaker in accordance with Figure 14, it is necessary to remove each of the switches 231 from its fixed relation with shaft 177, which carries the armature 176 of the electromagnet 172.

Attached to the end of the shaft 177 in place of the switch 231, is a pawl 371 biased by means of spring 372 into engagement with a ratchet 373. In addition, the locking device 374 is biased into cooperation with ratchet 373 by means of spring 375 which may be pinned to the frame of the circuit breaker.

The occurrence of an overload will displace shaft 177 to the left as viewed in Figure 14 and in conjunction with the pawl 371 and the locking device 375 will rotate the ratchet 373 through an angle as determined by a single notch thereon.

A lever 376 which is fastened to the ratchet by means of the screw 377 is positioned to operate a switch 381 which occupies the same position as switch 231 in the control circuit of Figure 12. Therefore, a number of operations of shaft 177 due to repeated circuit overloads will continuously rotate ratchet 373 until lever arm 376 opens switch 381 to open circuit all of the circuit breaker poles in a manner described in connection with the operation of switch 231.

A single overload occurring in one of the poles will move the ratchet one notch, vent the dome behind the diaphragm to open the single breaker, and due to the biasing action of the springs about shaft 177, the circuit breaker pole in which the fault occurred will reclose immediately following circuit interruption.

The number of successive interruptions which may be allowed before all of the poles are interrupted may be predetermined by suitably positioning the lever arm 376.

The system as indicated in Figure 14, provides a number of cycles prior to the interruption of the entire mercury arc rectifiers anode circuits and is cumulative in its operation, that is, if several cycles of opening and immediate reclosing are required to clear an internal rectifier backfire, and if similar backfires occur later in the operation of the rectifier, the ratchet 373 will again progress several notches and thus after several backfires or several instantaneous circuit interruptions, the ratchet will have progressed sufficiently to actuate the switch 381 and interrupt all of the circuit breaker poles. Thus, an anode which is frequently giving trouble will eventually cause the rectifier to be shut down.

In the above device, subsequent to the interruption of all of the circuit breaker poles, it is necessary to readjust or reorient the ratchet 373 in order to reset lever 376 to its original position. In order to overcome this inconvenience, the modification illustrated in Figure 13 may be employed.

In this modification, each of the switches 231 are in circuit with a solenoid 382 through a parallel circuit of an annunciator 383 and an electrically operated counter 384.

In this modification, the switches 231 have been removed from the control circuit in series with the tripping solenoid 315 and have all been replaced by a single switch 391 which is in operative relation with the solenoid plunger 385, through a notching mechanism as will now be explained.

This series circuit is connected across the terminals of a direct current control circuit such as the battery 314 of Figure 12, and thus following the actuation of any of the switches 231, the solenoid plunger 385 will operate upwardly as viewed in Figure 13.

The closure of one of the switches 231 will actuate the lever 386 of the annunciator about its pivot 387 to release the flag or other resettable visual indication 388 which provides an indication of the circuit breaker pole which has been operated. This visual indicator may be of the type which can only be reset manually. The operation of one of the switches 231 will correspondingly operate the associated counter 384 to provide some indication of the number of faults which occur in the particular anode circuit.

The closure of any switch 231 will operate the plunger 385 upwards as viewed in Figure 13 which will in turn cause rotation of lever 392 about a shaft 393. Rotatably mounted upon the shaft 393 is a ratchet wheel 394 which carries lever arm 395 in fixed relation thereto. A pawl 396 which is pivotally mounted upon the lever arm 392 is biased into engagement with the notches of ratchet 394 by means of a spring 398 and thus rotation of lever arm 392 due to axial displacements of plunger 385 will cause rotation of the ratchet 393.

A biasing spring 397 tends to rotate ratchet 393 in a direction opposite to that obtained by an upward displacement of plunger 385, and normally pulls lever 395 against a fixed stop 399.

A locking device 401 pivotally mounted upon the pin 402 is biased in the direction required for engagement with ratchet 394 and when in engagement therewith will prevent spring 397 from rotating the ratchet. However, locking device 401 is normally disengaged from ratchet 394 by means of the gravitational effect of a piston 403 and piston rod 404.

Piston rod 404 is in alignment with plunger rod 385 and its associated piston 403 is slidably fitted within a cylinder 405 which is vented through an adjustable exhaust 406. During normal operation of the circuit breaker anodes, the solenoid 382 is deenergized and thus the locking device piston and ratchet assume the positions indicated in Figure 13, wherein it may be seen that the pawl 396 engages a stop 400 which causes disengagement from ratchet wheel 394 and permits spring 397 to rotate the lever 395 against its stop 399.

Energization of coil 382 due to the closure of one of the switches 231 will rapidly raise plunger 385 and thus rotate ratchet 394 through one or more notches. In addition, the operation of plunger rod 385 will drive piston 403 up into the cylinder 405 and thus allow locking device 401 to come into engagement with ratchet 394 to preclude restoration to its original position immediately upon the deenergization of coil 382. Therefore, member 395 will remain in a substantially fixed position until piston 403 and its associated piston rod 404 descend and disengage the locking device 401 from the ratchet 394.

The adjustable small exhaust 406 provides in effect, when combined with the cylinder and piston a time delay mechanism inasmuch as the descent of piston 403 will be relatively slow. As the circuit breaker operation is similar to that previously described, the anode pole which has been opened due to a fault will immediately reclose. If the fault is still present within the circuit, the switch 231 will be reclosed immediately and will again actuate plunger rod 385 to again rotate ratchet 394 through one or more notches. And inasmuch as piston 403 has not completed its descent, the locking device 401 will again preclude the return of the ratchet to its original position.

Therefore, it may be seen that repeated operations of the circuit breaker contacts will cause a continued rotation of ratchet 394 and at the termination of the predetermined number of cycles, the member 395 will open switch 391 which, as previously mentioned, is in the control circuit and will interrupt all of the circuit breaker poles.

If, on the other hand, a rectifier fault occurs and a single opening and reclosure is sufficient to clear this fault, then the delayed descent of piston 403 would ultimately disengage the locking device 401 from the ratchet 394 and permit its return to its limiting position when the coil 382 is in the deenergized position.

If the circuit breaker is operating upon a permanent rectifier fault, a succession of operations will be required before switch 391 is opened to isolate the rectifier from the transformer secondaries.

Subsequent to the interruption, the piston 403 will descend and free the ratchet from the locking device to permit spring 397 to return the ratchet to its original position.

The entire system, as illustrated in Figure 13, will therefore serve as a counting mechanism in order that any of the anodes be allowed to operate several times before the mercury arc rectifier is isolated from the line. In addition, it serves to visually indicate upon which anode the fault has occurred and the total number of operations of each pole of the circuit breaker.

It is important to note that the systems illustrated in Figures 12, 13 and 14 are entirely schematic, that the valves, solenoids, relays, time delay mechanisms and the like have been illustrated in their simplest form merely to facilitate the explanation of the system involved.

The various relays and other devices required may be of the known commercial types and need only function as the devices illustrated in order that they may be applied to the control circuits.

The claims of the present application are directed to the structure of the circuit breaker. In divisional application Serial No. 432,774, filed February 28, 1942, a system in which this breaker may be employed, is disclosed and claimed. In application Serial No. 516,917, filed January 4, 1944, which is also a division, a valve structure for particular use with this circuit breaker, is disclosed and claimed. In application Serial No. 516,918, filed January 4, 1944, which is a division of the present application, the specific mounting between the tank and the circuit breaker, is disclosed and claimed.

It will be evident that many modifications of the above-described circuit breaker design and circuit breaker control systems may be made by those skilled in the art and therefore I do not wish to be limited to the specific disclosures hereinabove set forth but only by the scope of the appended claims.

I claim:

1. In an electric circuit interrupter for controlling an electric circuit, a stationary contact and a movable contact engageable therewith, a rod having two pistons attached thereto of different effective area, said movable contact being supported thereon, a source of compressed air, means responsive to electrical conditions of said circuit for controlling and directing air from said source against said contacts and one of said pistons having a larger effective area, for simultaneously disengaging said contacts and quenching arcs drawn therebetween; means for directing air to the other of said pistons for causing the engagement of said contacts; and means responsive to the disengagement of said contacts for disconnecting said source from both said pistons.

2. In a fluid blast circuit breaker, a housing, a first cylinder within said housing and a corresponding piston operable therein, a movable contact fixed relative to said piston and engageable with a stationary contact, a passage encircling said movable contact and communicating with the face of said piston, a contact closing cylinder coaxial with and of smaller diameter than said first cylinder, a piston in said closing cylinder, a piston rod interconnecting said pistons and said movable contact, means for introducing a fluid under pressure into said passage and spirally about said contacts for developing a force on said first mentioned piston, and means for introducing a fluid under pressure into said closing cylinder for developing a force on said closing piston, said forces being opposed, and resilient means for biasing said movable contact away from said stationary contact.

3. In an electric circuit interrupter, a stationary contact and a movable contact engageable therewith, said movable contact being supported upon a rod having two pistons attached thereto, a source of compressed air, and mechanism for controlling the flow of air from said source to said contacts and one of said pistons for simultaneously disengaging said contacts and quenching arcs drawn therebetween and means for simultaneously directing air to the other of said pistons tending to cause the engagement of said contacts.

4. In an air blast circuit breaker, a housing, a first cylinder within said housing and a corresponding piston operable therein, a movable contact fixed relative to said piston and engageable with a hollow stationary contact, an air passage encircling said movable contact and communicating with the face of said piston, a second cylinder in said housing coaxial with said first mentioned cylinder and axially displaced therefrom by the width of said passage, a flanged insulating tube in said second cylinder, said stationary contact being removably secured within said insulating tube, the inner diameter of said tube being greater than the outer diameter of said piston.

5. In an air blast circuit breaker, a housing, a first cylinder within said housing and a corresponding piston operable therein, a movable cotact fixed relative to said piston and engageable with a hollow stationary contact, an air passage encircling said movable contact and communicating with the face of said piston, a second cylinder in said housing coaxial with said first mentioned cylinder and axially displaced therefrom by the width of said passage, a flanged insulating tube in said second cylinder, said stationary contact being removably secured within said insulating tube, the inner diameter of said tube being greater than the outer diameter of said piston, a contact closing cylinder coaxial with and of smaller diameter than said first and second cylinders, a piston in said closing cylinder, a piston rod interconnecting said pistons and said movable contact, means for introducing air under pressure into said passage for developing a force on said first mentioned piston, and means for introducing air under pressure into said closing cylinder for developing a force on said closing piston, said forces being opposed.

6. In an air blast circuit interrupter for an electric circuit, a housing enclosing a pair of cooperable contacts, a source of compressed air, a main valve having a circular valve seat, and an air passage surrounding said contacts, a second air passage communicating with said source of compressed air and with said first passage across said circular valve seat, a valve disc for engaging said seat to prevent flow between said passages, a flexible diaphragm secured to said housing and supporting said valve disc, said diaphragm being movable toward and away from said seat, a member secured to said housing and enclosing the face of the diaphragm opposite said disc to form a space, means responsive to conditions in said circuit for controlling the pressure within said space for governing the engagement and disengagement of said valve disc and valve seat, comprising a duct from said compressed air supply entering into said dome shaped space to permit the development of supply pressure therein, means including said last mentioned means to vent said duct and release said pressure, a second discharge duct entering into said space from the atmosphere, a valve for sealing said duct, said circuit responsive means including a magnet energized in accordance with the current flowing through said contacts, said valve being operable by said magnet to vent said space for currents in excess of a predetermined value, said diaphragm being operable upon the reduction of pressure in said space to permit the influx of air to said first passage to cause the separation of said contacts.

7. In a pneumatically operated circuit interrupter for controlling an electric current, a stationary contact, a movable contact, a relatively large opening piston associated with said movable contact and a relatively small closing piston associated with said movable contact, cylinders for said pistons, means for applying air pressure to said closing piston for closing said contacts and maintaining them in current carrying engagement, means responsive to conditions in said circuit for applying an air pressure to said opening piston to overcome the force on said closing pistons and opening said contacts and means operative on the opening of said contacts for disconnecting said air supply from said opening cylinder.

8. In a pneumatically operated circuit breaker, a reciprocable element actuable by the difference in pressure in opposite sides thereof, an enclosure for one side of said element, a source of compressed air, a first duct between said source and said enclosure, a first valve means for connecting said duct to said source or to the atmosphere, a second valve means for opening said enclosure to the atmosphere, a second duct between said first duct and said enclosure, a check valve in said second duct for preventing flow of air from said first duct through said second duct to said enclosure, control means for first actuating said second valve to vent said enclosure, the flow of air from said first duct assisting in the evacuation of said enclosure, said control means subsequently effective to vent said first duct to the atmosphere to permit flow of air from said enclosure through said check valve to said first duct.

9. In a fluid blast circuit breaker, a housing, a first cylinder within said housing and a corresponding piston operable therein, a movable contact fixed relative to said piston and engageable with a hollow stationary contact, a passage encircling said movable contact and communicating with the face of said piston, an insulating tubing for carrying said fixed contact, said stationary contact being removably secured to said tubing, said contact having an additional air spacing between itself and said insulating tubing.

10. In a fluid blast circuit breaker having a pair of relatively movable contacts adapted to engage and disengage each other, a source of compressed fluid, a conduit from said source of fluid to said movable contacts, a main diaphragm valve for controlling the flow of air to said conduits through said movable contacts; a second valve, a second conduit from said source of compressed fluid to said first diaphragm; said second valve being connected in said second conduit for controlling the flow of air to said main diaphragm valve; means responsive to electrical conditions of said circuit breaker for operating said second valve for controlling the flow of fluid from said source of compressed fluid to said main diaphragm, means controlled by said compressed fluid when said fluid reaches said movable contact for operating said contacts into disengagement; and a third conduit from said source of compressed fluid for simultaneously applying pressure from said source to said relatively movable contacts for operating into and maintaining said contacts in engagement, said fluid passing over said first mentioned conduit overcoming the action of said fluid in said third passage for maintaining said contacts in disengagement against the action of said fluid in said third conduit.

11. In a circuit breaker having a fixed and a movable contact for controlling an electric circuit, fluid means for operating said movable contact into engagement with said fixed contact, and fluid means responsive to circuit conditions of said electric circuit for operating said movable contact to disengage said fixed contact against the action of said contact engaging means, said contact engaging means being operative on the opening of said circuit for re-operating said movable contact into engagement with said fixed contact, and means whereby said contact engaging means is rendered ineffective after a predetermined number of contact engaging operations.

WILLIAM M. SCOTT, Jr.